(12) United States Patent
Ooizumi et al.

(10) Patent No.: US 8,396,340 B2
(45) Date of Patent: Mar. 12, 2013

(54) OPTICAL FIBER AND METHOD FOR FABRICATING THE SAME

(75) Inventors: Haruo Ooizumi, Amagasaki (JP); Masayoshi Hachiwaka, Amagasaki (JP); Takaharu Kinoshita, Amagasaki (JP); Muneaki Ichihara, Amagasaki (JP); Masataka Kon, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 437 days.

(21) Appl. No.: 12/742,720

(22) PCT Filed: Nov. 13, 2008

(86) PCT No.: PCT/JP2008/003306
§ 371 (c)(1),
(2), (4) Date: May 13, 2010

(87) PCT Pub. No.: WO2009/066429
PCT Pub. Date: May 28, 2009

(65) Prior Publication Data
US 2010/0247048 A1    Sep. 30, 2010

(30) Foreign Application Priority Data

Nov. 19, 2007  (JP) .................................. 2007-299734

(51) Int. Cl.
*G02B 6/036* (2006.01)
(52) U.S. Cl. ...................................................... 385/127
(58) Field of Classification Search ................ None
See application file for complete search history.

(56) References Cited

U.S. PATENT DOCUMENTS

| 5,721,800 | A | * | 2/1998 | Kato et al. ..................... 385/127 |
| 7,068,901 | B2 | * | 6/2006 | Hirano et al. ................. 385/127 |
| 7,164,835 | B2 | * | 1/2007 | Matsuo et al. ................ 385/127 |
| 7,555,187 | B2 | * | 6/2009 | Bickham et al. .............. 385/127 |
| 2003/0152347 | A1 | * | 8/2003 | Matsuo et al. ................ 385/123 |
| 2004/0247269 | A1 | | 12/2004 | Hirono et al. |
| 2005/0244120 | A1 | | 11/2005 | Mishra |
| 2006/0024001 | A1 | | 2/2006 | Kobayashi |
| 2006/0039665 | A1 | * | 2/2006 | Matsuo et al. ................ 385/127 |
| 2007/0053642 | A1 | | 3/2007 | Mishra |
| 2007/0122091 | A1 | | 5/2007 | Kobayashi |

FOREIGN PATENT DOCUMENTS

| CN | 1727931 A | 2/2006 |
| CN | 1973222 A | 5/2007 |
| CN | 101055330 A | 10/2007 |
| JP | 61-122612 | 6/1986 |

(Continued)

*Primary Examiner* — Michelle R Connelly
(74) *Attorney, Agent, or Firm* — Renner, Otto, Boisselle & Sklar, LLP (57) ABSTRACT

An optical fiber includes: a core (1) having an outer diameter ($D_1$) of greater than or equal to 8.2 μm and less than or equal to 10.2 μm; a first cladding (2) surrounding the core (1) and having an outer diameter ($D_2$) of greater than or equal to 30 μm and less than or equal to 45 μm; a second cladding (3) surrounding the first cladding (2) and having a thickness (T) of greater than or equal to 7.4 μm; and a support layer (4) surrounding the second cladding (3). The relative refractive index difference which is the ratio of the difference between the refractive index of the support layer (4) and that of the second cladding (3) to the refractive index of the support layer (4) is greater than or equal to 0.5%.

4 Claims, 7 Drawing Sheets

FOREIGN PATENT DOCUMENTS

| | | |
|---|---|---|
| JP | 62-79207 | 5/1987 |
| JP | 63-121807 | 5/1988 |
| JP | 05-264816 | 10/1993 |
| JP | 09-145928 | 6/1997 |
| JP | 10-339822 | 12/1998 |
| JP | 11-231138 | 8/1999 |
| JP | 2006-184343 A | 7/2006 |
| JP | 3853833 B2 | 12/2006 |
| JP | 2007-279739 A | 10/2007 |
| JP | 2008-171985 A | 7/2008 |
| JP | 2008-209603 A | 9/2008 |
| WO | WO 03/086997 A1 | 10/2003 |
| WO | WO 2007/119509 A1 | 10/2007 |

* cited by examiner

FUNDAMENTAL MODE
HIGHER-ORDER MODE

FIG.8

(a) FUNDAMENTAL MODE (b) HIGHER-ORDER MODE

FUNDAMENTAL MODE
HIGHER-ORDER MODE

FIG.12
PRIOR ART

TIME

OPTICAL FIBER AND METHOD FOR FABRICATING THE SAME

This application is the U.S. National Phase under 35. U.S.C. §371 of International Application PCT/JP2008/003306, filed Nov. 13, 2008, which claims priority to Japanese Patent Application No. 2007-299734, filed Nov. 19, 2007. The International Application was published under PCT Article 21(2) in a language other than English.

TECHNICAL FIELD

The present invention relates to optical fibers and methods for fabricating the same, and more particularly relates to an optical fiber coupled to a general single-mode fiber and a method for fabricating the same.

BACKGROUND ART

In recent years, high-speed internet service called fiber to the home (FTTH) has been widely utilized in which optical fibers are brought into homes. Since FTTH systems require indoor wiring, a need exists for optical fibers which can accommodate small bend diameters.

For example, PATENT DOCUMENT 1 describes an optical fiber including a centrally located core, a first cladding layer surrounding the core, a second cladding layer surrounding the first cladding layer, and a third cladding layer surrounding the second cladding layer. The highest refractive index of the core is higher than each of the highest refractive indices of the first, second, and third cladding layers. The highest refractive index of the second cladding layer is lower than each of the highest refractive indices of the first and third cladding layers. When the core radius is $a_1$, and the radius of the outer circumference of the first cladding layer is $a_2$, the value $a_2/a_1$ is greater than or equal to 2.5 and less than or equal to 4.5. When the refractive index of the third cladding layer is used as a reference, the relative refractive index difference between the core and the third cladding layer is greater than or equal to 0.20% and less than or equal to 0.70%. The refractive index volume V of the second cladding layer defined by a predetermined equation corresponding to the equation below is greater than or equal to 25%$\mu m^2$ and less than or equal to 110% $\mu m^2$. PATENT DOCUMENT 1 further describes that the optical fiber has a low bending loss and good connectivity with a general transmission optical fiber and can be manufactured at low cost.

PATENT DOCUMENT 1: Japanese Patent No. 3853833

SUMMARY OF THE INVENTION

Technical Problem

However, although PATENT DOCUMENT 1 describes that the optical fiber of PATENT DOCUMENT 1 has good connectivity with a general transmission optical fiber, there is room for improvement in connectivity with a general single-mode fiber having a core diameter of 8-10 μm because the core diameter described in examples of PATENT DOCUMENT 1 is principally 6-8 μm.

The present invention has been made in view of the foregoing point, and an object thereof is to maintain connectivity with a general single-mode fiber and reduce the bending loss.

Solution to the Problem

In order to achieve the above object, the present invention provides the following optical fiber. Specifically, the optical fiber has a core diameter matched to the core diameter of a general single-mode fiber, and includes a first cladding of predetermined size surrounding the core, a second cladding of predetermined size surrounding the first cladding, and a support layer surrounding the second cladding. The relative refractive index difference which is the ratio of the difference between the refractive index of the support layer and that of the second cladding to the refractive index of the support layer falls within a predetermined range of values.

Specifically, an optical fiber according to the present invention includes: a core having an outer diameter of greater than or equal to 8.2 μm and less than or equal to 10.2 μm; a first cladding surrounding the core and having an outer diameter of greater than or equal to 30 μm and less than or equal to 45 μm; a second cladding surrounding the first cladding and having a thickness of greater than or equal to 7.4 μm; and a support layer surrounding the second cladding. The relative refractive index difference which is a ratio of a difference between a refractive index of the support layer and a refractive index of the second cladding to the refractive index of the support layer is greater than or equal to 0.5%.

With the above structure, since the outer diameter of the core is greater than or equal to 8.2 μm and less than or equal to 10.2 μm, the outer diameter of the core is matched to the core diameter of a general single-mode fiber. Since the outer diameter of the first cladding is greater than or equal to 30 μm, the wavelength dispersion (total dispersion) and the mode field diameter of the optical fiber are consistent. Therefore, single-mode operation is maintained (see FIG. 2). Moreover, since the outer diameter of the first cladding is less than or equal to 45 μm, this reduces the bending loss (see FIG. 3). Furthermore, since the thickness of the second cladding is greater than or equal to 7.4 μm, this reduces the bending loss (see FIG. 4). In addition, since the relative refractive index difference which is the ratio of the difference between the refractive index of the support layer and that of the second cladding to the refractive index of the support layer is greater than or equal to 0.5%, this reduces the bending loss (see FIG. 5). In view of the above, connectivity with a general single-mode fiber is maintained, and the bending loss is reduced.

A refractive index volume V of the second cladding is defined by Equation 1:

$$V = 2\int_{R_1}^{R_2} |\Delta n(r)| \cdot r\, dr \qquad \text{[Equation 1]}$$

where r is a radius of the optical fiber; $\Delta n(r)$ is the relative refractive index difference which is the ratio of the difference between the refractive index of the support layer and the refractive index of the second cladding to the refractive index of the support layer, when the radius of the optical fiber is r; $R_1$ is a radius of the first cladding; and $R_2$ is a radius of the second cladding. The refractive index volume V of the second cladding may be greater than or equal to 135% $\mu m^2$.

The above structure provides the following specific optical fiber. Specifically, the optical fiber includes, e.g., a first cladding having an outer diameter of 30 μm, a second cladding having a thickness of greater than or equal to 7.4 μm and less than or equal to 15 μm, and a support layer. The relative refractive index difference which is the ratio of the difference between the refractive index of the support layer and that of the second cladding to the refractive index of the support layer is greater than or equal to 0.5% and less than or equal to 1.5%.

The relative refractive index difference which is a ratio of a difference between a refractive index of the core and a refractive index of the first cladding to the refractive index of the first cladding may be greater than or equal to 0.30% and less than or equal to 0.39%.

The above structure provides a specific optical fiber having good connectivity with a general signal-mode fiber.

The second cladding may be doped with boron.

With the above structure, since the second cladding is doped with boron, light leaking into the second cladding (cladding mode) is attenuated. This reduces the mode interference between the fundamental mode in which light propagates principally through the core and the higher-order mode in which light propagates principally through the first cladding.

A ratio of the outer diameter of the first cladding to the outer diameter of the core may be 2.9-5.5.

The above structure provides a specific optical fiber including a core having an outer diameter of 8.2-10.2 μm and a first cladding having an outer diameter of 30-45 μm.

A method for fabricating an optical fiber according to the present invention is directed to a method for fabricating the optical fiber of the present invention by drawing a preform including a core forming portion, a first cladding forming portion surrounding the core forming portion, a second cladding forming portion surrounding the first cladding forming portion, and a support layer forming portion surrounding the second cladding forming portion. The method includes: producing a rod by depositing the first cladding forming portion on a circumferential surface of the rod-like core forming portion; producing a tube by depositing the second cladding forming portion on an inner wall of the tube-like support layer forming portion; and inserting the rod into the tube, and then collapsing the inserted rod and the tube, thereby producing the preform.

According to the above-described method, the first cladding forming portion is deposited on the circumferential surface of the core forming portion, thereby producing the rod (made of quartz). The second cladding forming portion is deposited on the inner wall of the support layer forming portion, thereby producing the tube (made of quartz). The rod is inserted into the tube, and then the rod and the inserted tube are collapsed, thereby integrating the quartz materials. Thus, the preform is produced. The above-described method can reduce fluctuations in the boundary between the integrated portions of the fabricated optical fiber, and can provide a sharp refractive index profile of the fabricated optical fiber.

An optical fiber according to the present invention includes: a core; a first cladding surrounding the core and having a lower refractive index than the core; and a second cladding surrounding the first cladding and having a lower refractive index than the first cladding. The first cladding is doped with light attenuating dopant so that a concentration of the light attenuating dopant in the first cladding increases from an inner surface of the first cladding to an outer surface of the first cladding.

The light attenuating dopant may be OH.

A ratio of an outer diameter of the first cladding to an outer diameter of the core may be 2.9-5.5.

A method for fabricating an optical fiber according to the present invention is directed to a method for fabricating the optical fiber of the present invention by drawing a preform including a core forming portion, a first cladding forming portion surrounding the core, and a second cladding forming portion surrounding the first cladding forming portion. The method includes forming the first cladding forming portion, and then introducing light attenuating dopant from an outer surface of the first cladding forming portion into the first cladding forming portion.

Advantages of the Invention

According to the present invention, an optical fiber has a core diameter matched to the core diameter of a general single-mode fiber, and includes a first cladding of predetermined size surrounding the core, a second cladding of predetermined size surrounding the first cladding, and a support layer surrounding the second cladding. The relative refractive index difference which is the ratio of the difference between the refractive index of the support layer and that of the second cladding to the refractive index of the support layer falls within a predetermined range of values. In view of the above, connectivity with a general single-mode fiber can be maintained, and the bending loss can be reduced.

BRIEF DESCRIPTION OF THE DRAWINGS

FIG. 2 is a graph illustrating the behaviors of the total dispersion and mode field diameter of the optical fiber 10a with respect to the radius of a first cladding 2 forming a portion of the optical fiber 10a.

FIG. 3 is a graph illustrating the behavior of the bending loss of the optical fiber 10a with respect to the outer diameter of the first cladding 2 forming a portion of the optical fiber 10a.

FIG. 4 is a graph illustrating the behavior of the bending loss of the optical fiber 10a with respect to the thickness of a second cladding 3 forming a portion of the optical fiber 10a.

FIG. 7 is a diagram illustrating propagation of optical signals through the optical fiber 10a.

DESCRIPTION OF REFERENCE CHARACTERS 1, 11 CORE
2, 12 FIRST CLADDING
3, 13 SECOND CLADDING
4, 14 SUPPORT LAYER
10a, 10b OPTICAL FIBER
20 PREFORM
21 CORE FORMING PORTION
22 FIRST CLADDING FORMING PORTION
23 SECOND CLADDING FORMING PORTION
24 SUPPORT LAYER FORMING PORTION

25 ROD
26 TUBE

DESCRIPTION OF EMBODIMENTS

Embodiments of the present invention will be described hereinafter with reference to the drawings. The present invention is not limited to the following embodiments.

First Embodiment of the Invention

Figure 1:
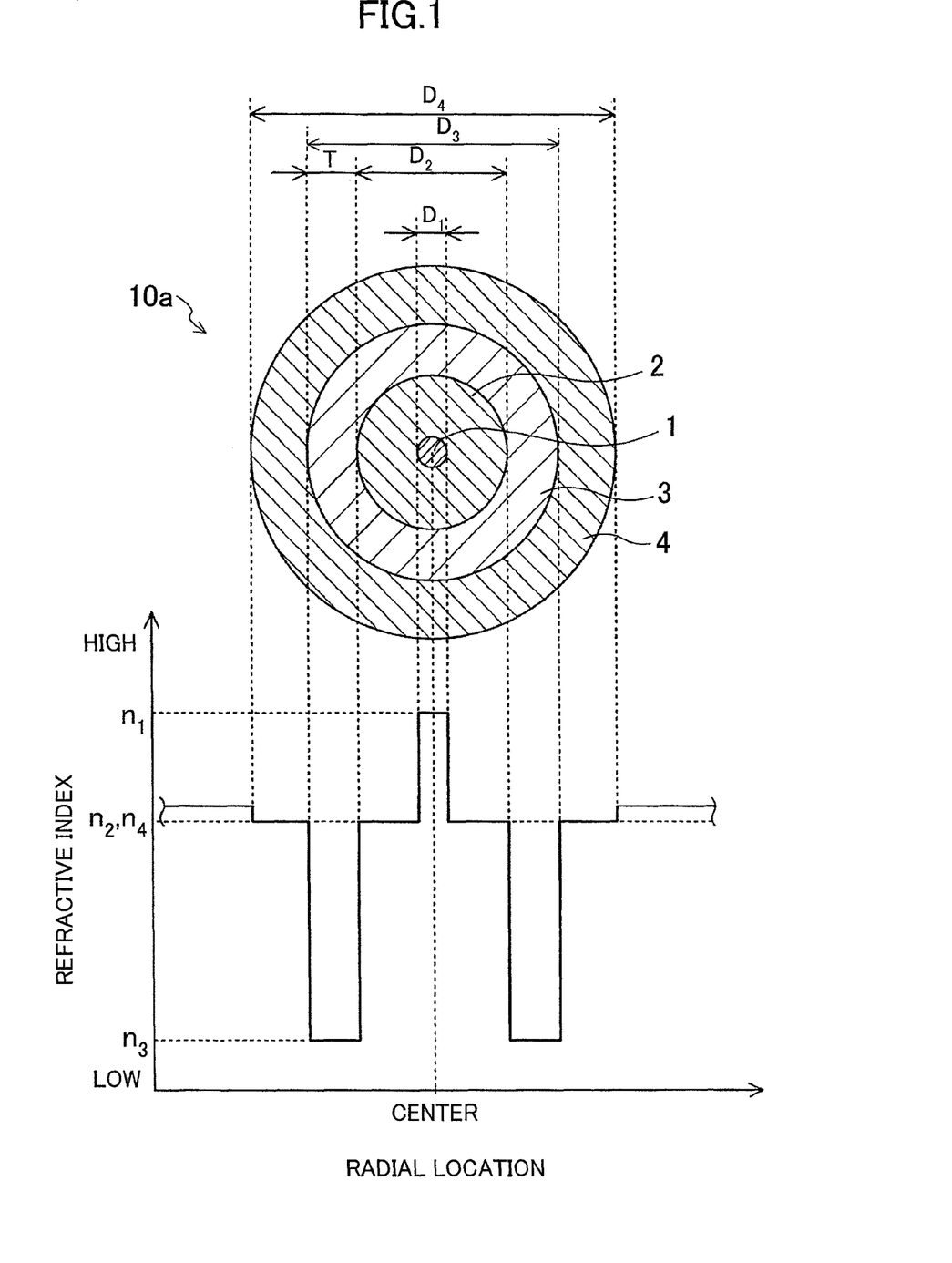
FIG. 1 is a schematic diagram schematically illustrating a transverse cross-sectional view of an optical fiber 10a according to a first embodiment and a corresponding refractive index profile of the optical fiber 10a together.

FIGS. 1-8 illustrate an optical fiber according to a first embodiment of the present invention and a method for fabricating the same. Specifically, FIG. 1 is a schematic view schematically illustrating a cross-sectional view of an optical fiber 10a of this embodiment and a corresponding refractive index profile of the optical fiber 10a together.

As illustrated in FIG. 1, the optical fiber 10a includes a centrally located core 1, a first cladding 2 surrounding the core 1, a second cladding 3 surrounding the first cladding 2, a support layer 4 surrounding the second cladding 3, and a protection layer (not illustrated) surrounding the support layer 4 and made of resin.

The core 1 is made of, for example, quartz doped with, e.g., germanium, and has a higher refractive index $n_1$ than pure quartz as illustrated in FIG. 1.

The first cladding 2 is made of quartz, and has a refractive index $n_2$ substantially equal to that of pure quartz as illustrated in FIG. 1.

Figure 2:
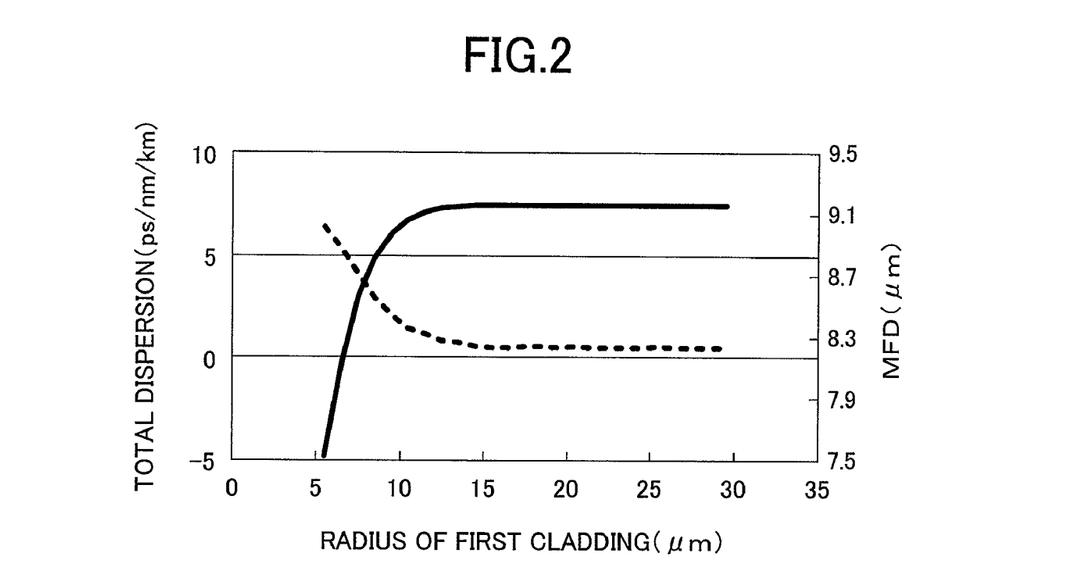

Here, FIG. 2 is a graph illustrating the behaviors of the total dispersion and mode field diameter (MFD) of the optical fiber 10a with respect to the radius of the first cladding 2 when the wavelength of light to be transmitted is 1310 nm. In FIG. 2, the behavior of the MFD is shown by the solid line, and the behavior of the total dispersion is shown by the broken line.

Referring to FIG. 2, when the radius of the first cladding is greater than or equal to 15 μm, the behaviors of the wavelength dispersion (total dispersion) and the mode field diameter are consistent. Therefore, when the outer diameter $D_2$ of the first cladding 2 is greater than or equal to 30 μm (=15 μm×2), single-mode operation can be maintained.

Figure 3:
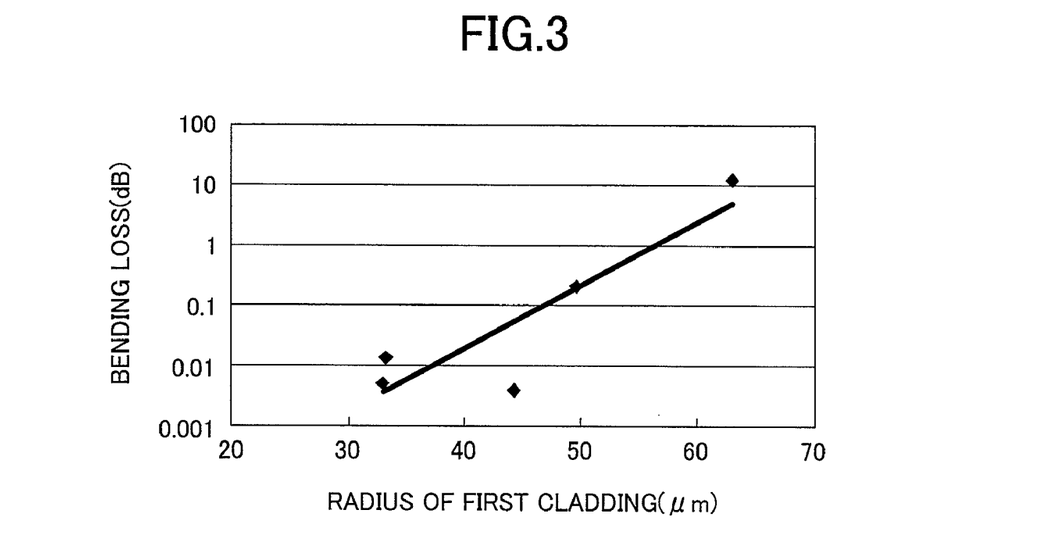

FIG. 3 is a graph illustrating the behavior of the bending loss of the optical fiber with respect to the outer diameter $D_2$ of the first cladding 2. Here, the bending loss was calculated in the following manner: measurements were made of the intensity of light at the exit end of the optical fiber which is wrapped ten times around a mandrel having a diameter of 10 mmφ, and the intensity of light at the exit end of the optical fiber which is not wrapped around the mandrel; and a comparison was made between the measured light intensities.

Referring to FIG. 3, when the outer diameter $D_2$ of the first cladding 2 is less than or equal to 45 μm, the bending loss is less than 0.1 dB, which is generally considered as being at desired levels. Therefore, when the outer diameter $D_2$ of the first cladding 2 is less than or equal to 45 μm, the bending loss can be reduced to the desired levels.

Furthermore, the relative refractive index difference $\Delta_1$ which is the ratio of the difference between the refractive index of the core 1 and that of the first cladding 2 to the refractive index of the first cladding 2 is greater than or equal to 0.30% and less than or equal to 0.39%. The relative refractive index difference $\Delta_1$ is equal to $|n_2-n_1|/n_2 \times 100$. When the relative refractive index difference $\Delta_1$ is greater than or equal to 0.30% and less than or equal to 0.39%, the outer diameter of the core 1 is greater than or equal to 8.2 μm and less than or equal to 10.2 μm in order to allow the optical fiber to have a mode field diameter (8.6-9.6 μm) defined in, e.g., the "JIS C6835" or "ITU-T G.652" standard.

The second cladding 3 is made of, for example, quartz doped with, e.g., fluorine or boron, and has a lower refractive index $n_3$ than pure quartz as illustrated in FIG. 1.

Figure 4:
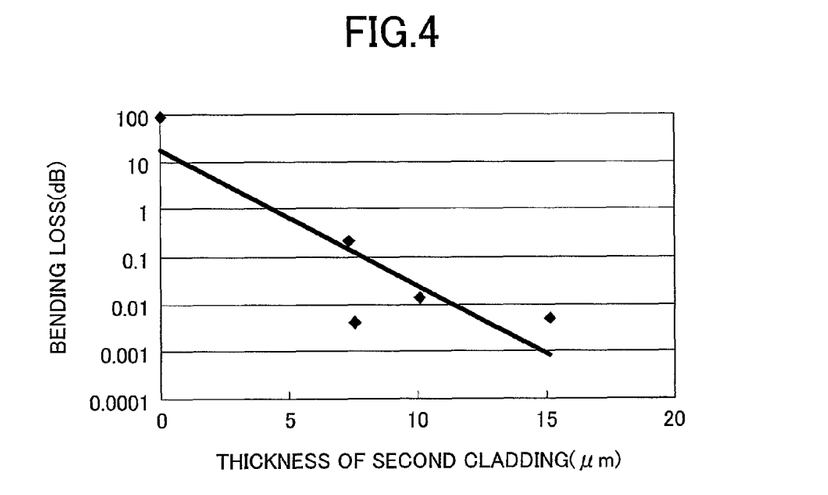

Here, FIG. 4 is a graph illustrating the behavior of the bending loss of the optical fiber with respect to the thickness T of the second cladding 3.

Referring to FIG. 4, when the thickness T of the second cladding 3 is greater than or equal to 7.4 μm, the bending loss is less than 0.1 dB, which is generally considered as being at desired levels. Therefore, when the thickness T of the second cladding 3 is greater than or equal to 7.4 μm, the bending loss can be reduced to the desired levels. For example, in view of cracks which may be caused during manufacturing, the thickness T of the second cladding 3 is preferably less than or equal to 15 μm.

The support layer 4 is made of quartz, and has a refractive index $n_4$ substantially equal to that of pure quartz as illustrated in FIG. 1.

Figure 5:
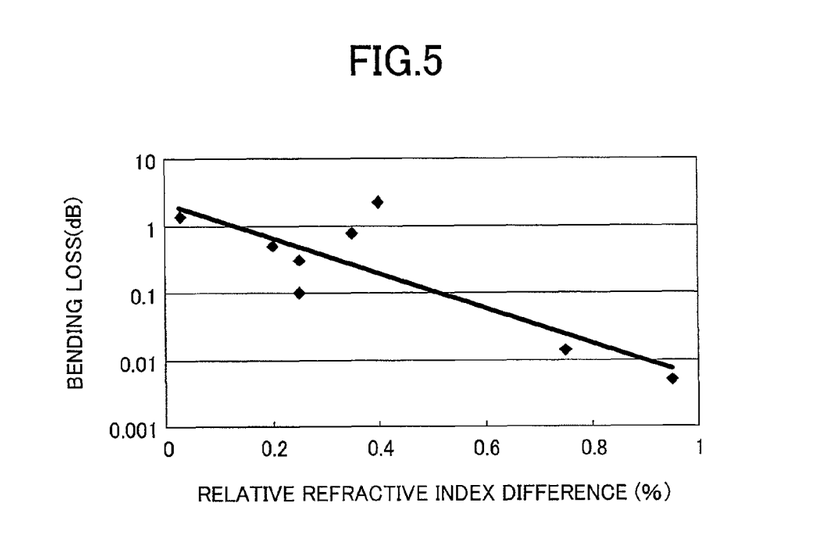
FIG. 5 is a graph illustrating the behavior of the bending loss of the optical fiber 10a with respect to the relative refractive index difference which is the ratio of the difference between the refractive index of the support layer 4 and that of the second cladding 3 to the refractive index of the support layer 4.

Here, FIG. 5 is a graph illustrating the behavior of the bending loss of the optical fiber with respect to the relative refractive index difference $\Delta_2$ which is the ratio of the difference between the refractive index of the support layer 4 and that of the second cladding 3 to the refractive index of the support layer 4. The relative refractive index difference $\Delta_2$ is equal to $(n_4-n_3)/n_4 \times 100$.

Referring to FIG. 5, when the relative refractive index difference $\Delta_2$ is greater than or equal to 0.5%, the bending loss is less than 0.1 dB, which is generally considered as being at desired levels. Therefore, when the relative refractive index difference $\Delta_2$ is greater than or equal to 0.5%, the bending loss can be reduced to the desired levels. For example, in view of cracks which may be caused during manufacturing, the relative refractive index difference $\Delta_2$ is preferably less than or equal to 1.5%.

Assume the following: the outer diameter $D_2$ of the first cladding 2 is 30 μm; the thickness T of the second cladding 3 is greater than or equal to 7.4 μm and less than or equal to 15 μm; and the relative refractive index difference $\Delta_2$ which is the ratio of the difference between the refractive index of the support layer 4 and that of the second cladding 3 to the refractive index of the support layer 4 is greater than or equal to 0.5% and less than or equal to 1.5%. In this case, the refractive index volume V of the second cladding 3 defined by the equation described below is greater than or equal to 135%μm² and less than or equal to 1100%μm².

$$V = 2\int_{R_1}^{R_2} |\Delta n(r)| \cdot r dr \qquad \text{[Equation 1]}$$

In the above equation, the character r denotes the radius of the optical fiber; the character $\Delta n(r)$ denotes the relative refractive index difference which is the ratio of the difference between the refractive index of the support layer 4 and that of the second cladding 3 to the refractive index of the support layer 4 when the radius of the optical fiber is r; the character $R_1$ denotes the radius of the first cladding 2 (=$D_2/2$); and the character $R_2$ denotes the radius of the second cladding 3 (=$D_3/2$).

Figure 6:
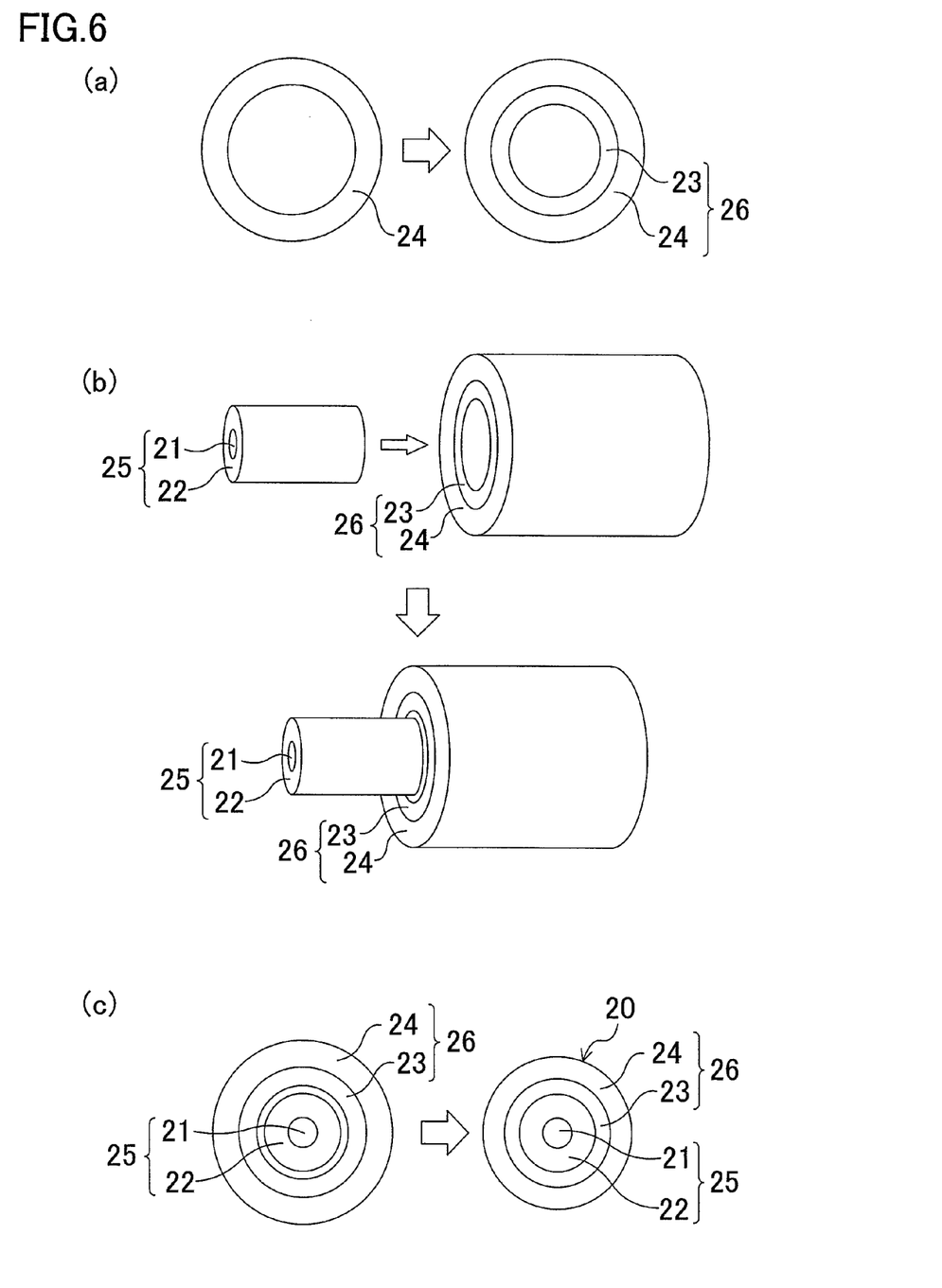
FIGS. 6(a)-6(c) are diagrams illustrating a method for producing a preform 20.

Next, a fabrication method for an optical fiber 10a having the above-described structure will be described with reference to FIG. 6. Here, FIG. 6 are illustrations of a method for producing a preform 20 used to fabricate the optical fiber 10a.

The optical fiber 10a can be fabricated by drawing the preform 20 including a core forming portion 21, a first cladding forming portion 22 surrounding the core forming portion 21, a second cladding forming portion 23 surrounding the first cladding forming portion 22, and a support layer forming portion 24 surrounding the second cladding forming portion 23.

The preform 20 can be produced by chemical vapor deposition (CVD), vapor-phase axial deposition (VAD), or outside vapor phase deposition (OVD). In order to obtain the optical fiber 10a, a process for producing this preform 20 may include process steps of: producing a rod by depositing the first cladding forming portion on the circumferential surface of the rod-like core forming portion; producing a tube by depositing the second cladding forming portion on the inner wall of the tube-like support layer forming portion; and inserting the rod into the tube, and then collapsing the tube and the inserted rod to produce a preform.

Specifically, as illustrated in FIG. 6(a), while, for example, $SiCl_4$, $O_2$, and $BF_3$ are introduced into the support layer forming portion 24 forming a quartz glass tube, the support layer forming portion 24 is heated and vitrified with an oxygen-hydrogen flame. In this manner, the second cladding forming portion 23 is deposited on the inside of the support layer forming portion 24, thereby producing a tube 26. As illustrated in FIG. 6(b), a rod 25 includes the core forming portion 21, and the first cladding forming portion 22 deposited on the core forming portion 21 by CVD or VAD, and is inserted into the tube 26. Then, as illustrated in FIG. 6(c), the tube 26 and the inserted rod 25 may be heated with an oxygen-hydrogen flame so as to be collapsed.

When the produced preform 20 is drawn, the furnace temperature is preferably, for example, 1800-2200° C., and the drawing speed is preferably, for example, 100-1000 m/min.

Next, as illustrated in Table 1 below, optical fibers (Examples 1-3) corresponding to the optical fiber 10a having the above structure were produced. Here, Comparative Examples 1, 2, and 3 given in Table 1 indicate data based on Example 1 of the above-described PATENT DOCUMENT 1 (paragraphs [0107] and [0108]), Example 2 thereof (paragraphs [0116] and [0117]), and Example 3 thereof (paragraphs [0124] and [0125]), respectively.

TABLE 1

| | CORE | | | | FIRST CLADDING | | |
|---|---|---|---|---|---|---|---|
| | OUTER DIAMETER $D_1$ (μm) | RELATIVE REFRACTIVE INDEX DIFFERENCE $\Delta_1$ (%) | CROSS-SECTIONAL AREA $S_1$ (μm$^2$) | $\Delta_1 \cdot S_1$ | OUTER DIAMETER $D_2$ (μm) | CROSS-SECTIONAL AREA $S_2$ (μm$^2$) | $D_2/D_1$ |
| EXAMPLE 1 | 9 | 0.3 | 63.62 | 19.09 | 30 | 643.2 | 3.333 |
| EXAMPLE 2 | 9 | 0.39 | 63.62 | 24.81 | 30 | 643.2 | 3.333 |
| EXAMPLE 3 | 9 | 0.34 | 63.62 | 21.63 | 34 | 844.3 | 3.778 |
| COMPARATIVE EXAMPLE 1 | 6.18 | 0.5 | 30.00 | 15.00 | 23.66 | 409.7 | 3.828 |
| COMPARATIVE EXAMPLE 2 | 6.8 | 0.4 | 36.32 | 14.53 | 22.96 | 377.7 | 3.376 |
| COMPARATIVE EXAMPLE 3 | 6.24 | 0.52 | 30.58 | 15.90 | 20.6 | 302.7 | 3.301 |

| | SECOND CLADDING | | | | |
|---|---|---|---|---|---|
| | OUTER DIAMETER $D_3$ (μm) | RELATIVE REFRACTIVE INDEX DIFFERENCE $\Delta_2$ (%) | CROSS-SECTIONAL AREA $S_3$ (μm$^2$) | $\Delta_2 \cdot S_3$ | REFRACTIVE INDEX VOLUME V (% μm$^2$) |
| EXAMPLE 1 | 44.8 | 0.5 | 869.5 | 434.7 | 138.38 |
| EXAMPLE 2 | 60 | 1.5 | 2120.6 | 3180.9 | 1012.05 |
| EXAMPLE 3 | 50 | 0.75 | 1055.6 | 791.7 | 252.00 |
| COMPARATIVE EXAMPLE 1 | 33.9 | 0.25 | 462.9 | 115.7 | 36.84 |
| COMPARATIVE EXAMPLE 2 | 32.9 | 0.4 | 436.1 | 174.4 | 55.52 |
| COMPARATIVE EXAMPLE 3 | 33.24 | 0.25 | 534.5 | 133.6 | 42.53 |

As illustrated in Table 1 above, the following elements in Examples 1-3 of this embodiment are different from those in Comparative Examples 1-3: the outer diameter $D_1$ of the core 1; the outer diameter $D_2$ of the first cladding 2; the outer diameter $D_3$ of the second cladding 3; the relative refractive index difference $\Delta_1$ which is the ratio of the difference between the refractive index of the first cladding 2 and that of the core 1 to the refractive index of the first cladding 2; the relative refractive index difference $\Delta_2$ which is the ratio of the difference between the refractive index of the support layer 4 and that of the second cladding 3 to the refractive index of the support layer 4; and the refractive index volume V of the second cladding 3. Such structures of the optical fibers of Examples 1-3 can maintain connectivity with a general single-mode fiber and reduce the bending loss.

As described above, according to the optical fiber 10a of this embodiment, since the outer diameter $D_1$ of the core 1 is greater than or equal to 8.2 μm and less than or equal to 10.2 μm, the outer diameter $D_1$ of the core 1 can be matched to the core diameter of a general single-mode fiber. Since the outer diameter $D_2$ of the first cladding 2 is greater than or equal to 30 μm, the wavelength dispersion (total dispersion) and the mode field diameter are consistent. Therefore, single-mode operation can be maintained. Moreover, since the outer diameter $D_2$ of the first cladding 2 is less than or equal to 45 μm, this can reduce the bending loss. Furthermore, since the thickness T of the second cladding 3 is greater than or equal to 7.4 μm, this can reduce the bending loss. In addition, since the relative refractive index difference $\Delta_2$ which is the ratio of the difference between the refractive index of the support layer 4 and that of the second cladding 3 to the refractive index of the support layer 4 is greater than or equal to 0.5%, this can reduce the bending loss. In view of the above, the optical fiber 10*a* of this embodiment can maintain connectivity with a general single-mode fiber and reduce the bending loss.

Figure 7:
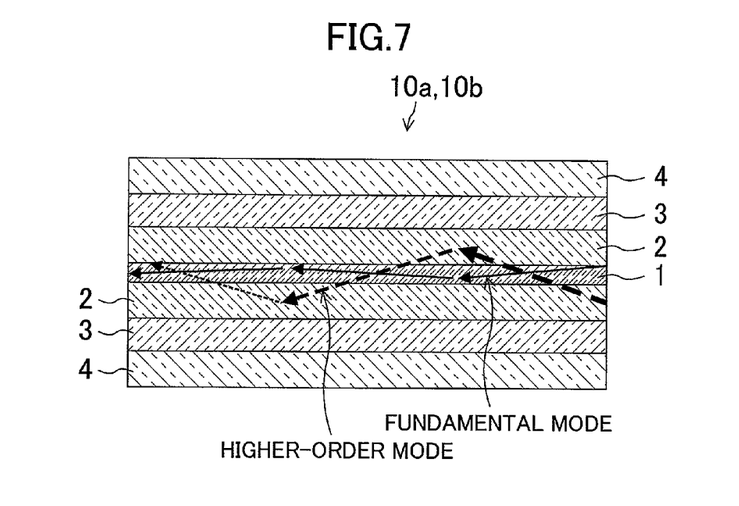
Figure 8:
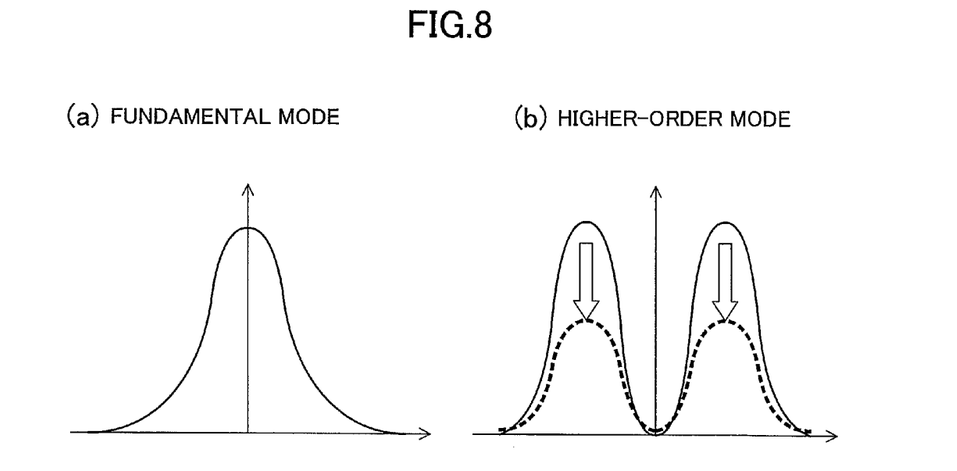
FIG. 8(a) is a light intensity profile of an optical signal in a fundamental mode.
FIG. 8(b) is a light intensity profile of an optical signal in a higher-order mode.
Figure 11:
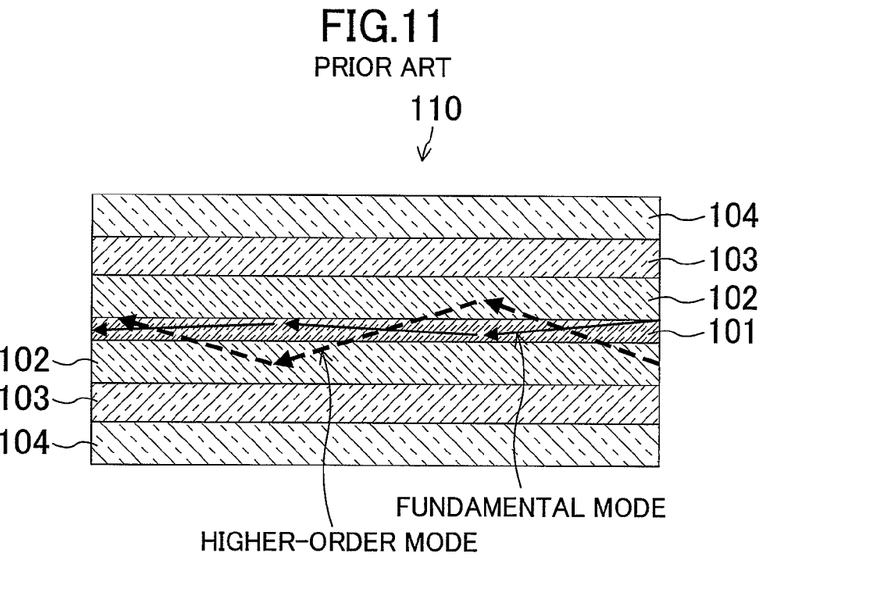
FIG. 11 is a diagram illustrating propagation of optical signals through a conventional optical fiber.
Figure 12:
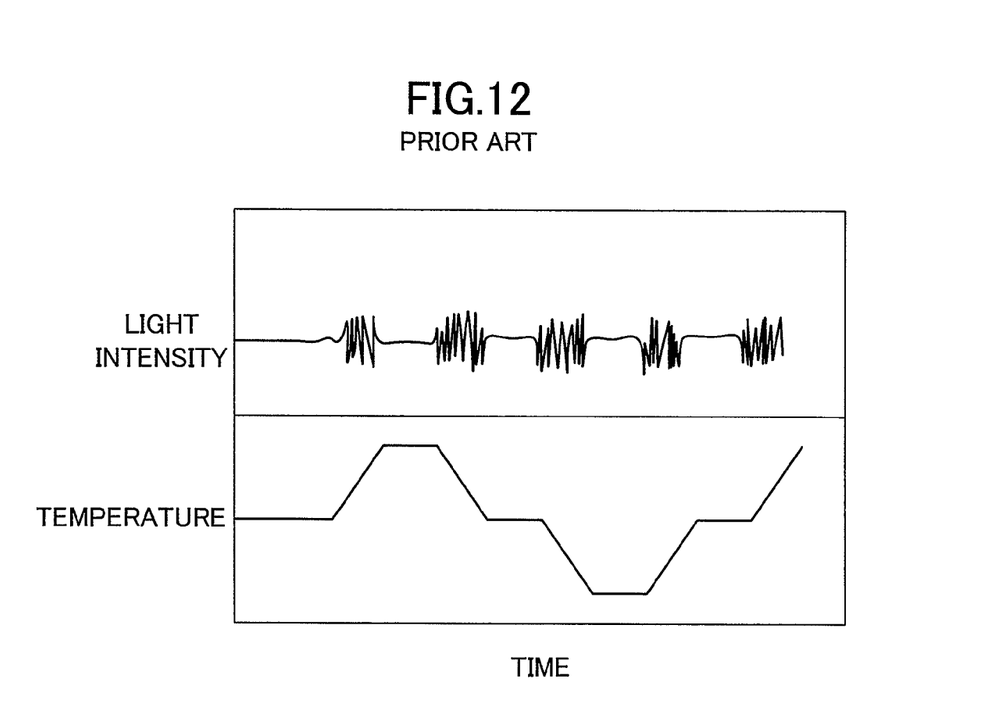
FIG. 12 is a diagram illustrating fluctuations in the light intensity of a conventional optical signal.

Assume the following: when the optical fiber 10*a* of this embodiment is connected with another single-mode optical fiber, axial misalignment of the core 1 is caused; and as illustrated in FIG. 7, an optical signal in the fundamental mode propagates principally through the core 1 while an optical signal in a higher-order mode is generated in the first cladding 2 and propagates through the optical fiber 10*a*. Even in this case, since the second cladding 3 is doped with boron, this enables low attenuation of the optical signal in the fundamental mode, and enables advantageous attenuation of the optical signal in the higher-order mode as illustrated in FIGS. 8(*a*) and 8(*b*). This can reduce the mode interference between the fundamental mode and the higher-order mode. Here, FIG. 11 is an illustration of propagation of optical signals through a known optical fiber, and FIG. 12 is an illustration of fluctuations in light intensity of a known optical signal. For example, when an optical fiber 110 including a plurality of known cladding layers 102-104 is connected with a typical communications single-mode optical fiber, axial misalignment of a core 101 of the optical fiber 110 may be caused. In this case, as illustrated in FIG. 11, an optical signal in the fundamental mode propagates principally through the core 101 while an optical signal in a higher-order mode is generated in the cladding layer 102 surrounding the outer surface of the core 101 and propagates through the optical fiber 110. As illustrated in FIG. 12, for example, with temperature change, the phase difference between the fundamental mode and the higher-order mode changes, leading to a mode interference therebetween. This causes fluctuations in light intensity of an optical signal at the exit end of the fiber. The mode interference is caused, depending also on the fiber length and the wavelength of the optical signal.

Furthermore, according to the fabrication method for an optical fiber 10*a* of this embodiment, the first cladding forming portion 22 is deposited on the circumferential surface of the core forming portion 21, thereby producing the rod 25 made of quartz. The second cladding forming portion 23 is deposited on the inner wall of the support layer forming portion 24, thereby producing the tube 26 made of quartz. The rod 25 is inserted into the tube 26, and then the rod 25 and the inserted tube 26 are collapsed, thereby integrating the quartz materials. Thus, the perform 20 is produced. The method described above can reduce fluctuations in the boundary between the integrated portions of the fabricated optical fiber 10*a*, and can provide a sharp refractive index profile of the fabricated optical fiber 10*a*.

Second Embodiment of the Invention

Figure 9:
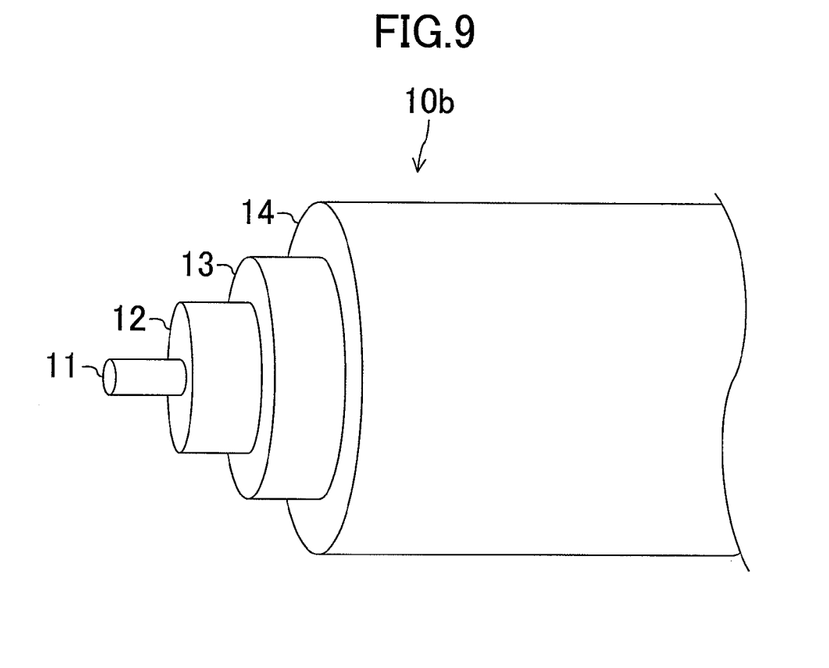
FIG. 9 is a perspective view illustrating the structure of an optical fiber 10b according to a second embodiment.

FIG. 9 illustrates an optical fiber 10*b* of this embodiment. The optical fiber 10*b* is an optical fiber for communications. The optical fiber 10*b* is connected with, e.g., a single-mode optical fiber branching from an optical fiber cable, and is placed, particularly, at the location where the optical fiber 10*b* should be bent.

The optical fiber 10*b* includes a core 11, a first cladding 12, a second cladding 13, and a support layer 14 which are arranged sequentially from the fiber core. The core 11, the first cladding 12, the second cladding 13, and the support layer 14 are concentrically assembled together.

The core 11 is made of, e.g., quartz doped with dopant serving to increase the refractive index of the doped material, and has an outer diameter of 8-10 µm and a refractive index of 1.460-1.462. The refractive index herein denotes the refractive index for standard air at room temperature.

Examples of the dopant serving to increase the refractive index of the doped material include, typically, germanium (Ge), and otherwise phosphorus (P). The quartz may be doped with a single dopant serving to increase the refractive index of the doped material. Alternatively, the quartz may be doped with multiple dopants serving to increase the refractive index of the doped material. The concentration of such a dopant or dopants in the core 11 is preferably 2.9-4.0% by weight.

The first cladding 12 is made of, e.g., quartz doped with light attenuating dopant, and has an outer diameter of 30-40 µm and a refractive index of 1.450-1.454.

Examples of the light attenuating dopant include hydroxyl groups (OH) and hydrogen ($H_2$). Among these examples, OH is preferable because light absorption in OH can be easily controlled. The quartz may be doped with a single light attenuating dopant. Alternatively, the quartz may be doped with multiple light attenuating dopants.

The quartz is doped with the light attenuating dopant so that the concentration of the light attenuating dopant in the first cladding 12 is modulated to continuously increase from the inner surface of the first cladding 12 toward the outer surface thereof. The average concentration of the light attenuating dopant in the first cladding 12 is preferably 100-10000 ppm by weight.

The second cladding 13 is made of, e.g., quartz doped with dopant serving to decrease the refractive index of the doped material, and has an outer diameter of 44-75 µm and a refractive index of 1.430-1.444.

Examples of the dopant serving to decrease the refractive index of the doped material include boron (B) and fluorine (F). The quartz may be doped with a single dopant serving to decrease the refractive index of the doped material. Alternatively, the quartz may be doped with multiple dopants serving to decrease the refractive index of the doped material. The concentration of such a dopant or dopants in the second cladding 13 is preferably 2.0-25% by weight.

The support layer 14 is made of, e.g., pure quartz, and has an outer diameter of 123-127 µm (typically 125 µm) and a refractive index of 1.450-1.454.

The optical fiber 10*b* having the above structure and coated with an unillustrated coating layer made of resin is used as a coated optical fiber.

Figure 10:
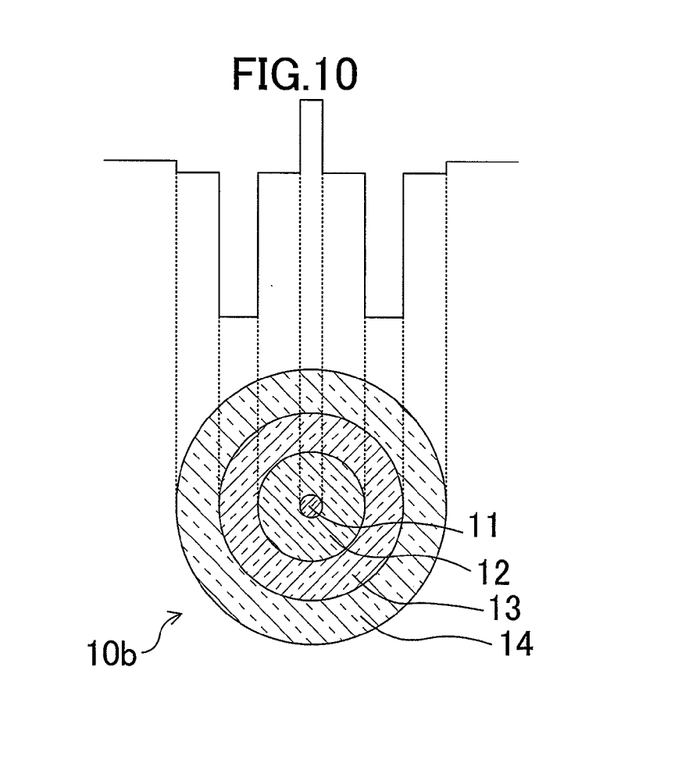
FIG. 10 is a diagram illustrating the optical fiber 10b and a corresponding refractive index profile of the optical fiber 10b together.

FIG. 10 illustrates the refractive index profile of the optical fiber 10*b* of this embodiment.

When the refractive index of the first cladding 12 and support layer 14 is used as a reference, a portion of the refractive index profile corresponding to the core 11 is convex upward, and corresponds to a portion of the optical fiber 10*b* having a higher refractive index than the reference. In contrast, a portion of the refractive index profile corresponding to the second cladding 13 corresponds to a portion of the optical fiber 10*b* having a lower refractive index than the reference, and has a trench structure in which the portion of the refractive index profile is strongly concave downward. Even when the optical fiber 10*b* is bent to a small radius of curvature, the above-described structure of the optical fiber 10*b* advantageously reduces light leakage outside the second cladding 13.

Assume the following: when the optical fiber 10*b* of this embodiment is connected with another single-mode optical fiber, axial misalignment of the core 11 is caused; and as illustrated in FIG. 7, an optical signal in the fundamental mode propagates principally through the core 11 while an optical signal in a higher-order mode is generated in the first cladding 12 and propagates through the optical fiber 10b. Even in this case, since the first cladding 12 is doped with light attenuating dopant so that the concentration of the light attenuating dopant in the first cladding 12 increases from the inner surface of the first cladding 12 toward the outer surface thereof, this provides the following advantages as illustrated in FIGS. 8(a) and 8(b). Specifically, since the concentration of the light attenuating dopant in part of the first cladding 12 located near the core 11 through which the optical signal in the fundamental mode principally propagates is relatively low, this enables low attenuation of the optical signal in the fundamental mode. In contrast, since the concentration of the light attenuating dopant in part of the first cladding 12 located near the interface between the first cladding 12 through which the optical signal in the higher-order mode principally propagates, and the second cladding 13 is relatively high, this enables advantageous attenuation of the optical signal in the higher-order mode before and after reflection of the optical signal at the interface. Therefore, the above structure of the optical fiber 10b can reduce the mode interference between the fundamental mode and the higher-order mode.

When the wavelength range of the optical signal attenuated by absorption is narrow, such as when the light attenuating dopant with which the first cladding 12 is doped is a hydroxyl group (OH), an optical signal having, e.g., a wavelength in the 1300 nm band can be advantageously absorbed and attenuated. In contrast, when fiber identification is performed, absorption-induced attenuation of identification light propagating through the first cladding 12 and having wavelengths in the 1650 nm band and the 650 nm band is low. Thus, there is no problem in performing fiber identification. The difference between the loss of the optical signal and the loss of the identification light is preferably greater than or equal to 10 dB.

Next, a fabrication method for an optical fiber 10b according to this embodiment will be described.

The optical fiber 10b of this embodiment can be fabricated by drawing a preform 20 including a core forming portion 21, a first cladding forming portion 22 surrounding the core forming portion 21, a second cladding forming portion 23 surrounding the first cladding forming portion 22, and a support layer forming portion 24 surrounding the second cladding forming portion 23.

The preform 20 can be produced by CVD, VAD, or OVD. In order to obtain the optical fiber 10b, a process for producing the preform 20 may include a process step of introducing light attenuating dopant from the outer surface of the first cladding forming portion 22 into the first cladding forming portion 22 after the formation of the first cladding forming portion 22. When the light attenuating dopant is introduced from the outer surface of the first cladding forming portion 22 into the first cladding forming portion 22 as described above, the concentration of the introduced light attenuating dopant in part of the first cladding forming portion 22 located near the outer surface thereof is high, and the concentration of the introduced light attenuating dopant in part of the first cladding forming portion 22 located near the inner surface thereof is low. Specifically, examples of methods for doping the first cladding forming portion 22 with a hydroxyl group (OH) as the light attenuating dopant include a method in which, after the formation of the first cladding forming portion 22, the outer surface of the first cladding forming portion 22 is oxidized in a flame.

As illustrated in FIG. 6, a rod-in-tube technique can be also used to produce the preform 20.

Specifically, as illustrated in FIG. 6(a), the second cladding forming portion 23 is deposited on the inner wall of the support layer forming portion 24 forming a quartz glass tube by modified chemical vapor deposition (MCVD). As illustrated in FIG. 6(b), a multilayer structure including the core forming portion 21 and the first cladding forming portion 22 is produced by CVD or VAD. The multilayer structure includes light attenuating dopant introduced from the outer surface of the first cladding forming portion 22 into the first cladding forming portion 22, and is inserted into the support layer forming portion 24 on which the second cladding forming portion 23 is deposited. As illustrated in FIG. 6(c), the multilayer structure, and the support layer forming portion 24 on which the second cladding forming portion 23 is deposited may be collapsed.

When the produced preform 20 is drawn, the furnace temperature is preferably, for example, 1800-2200° C., and the drawing speed is preferably, for example, 100-1000 m/min.

In this embodiment, the core 11, the first cladding 12, and the second cladding 13 are doped with dopant serving to increase the refractive index of the doped material, light attenuating dopant, and dopant serving to decrease the refractive index of the doped material, respectively, and the support layer 14 is made of pure quartz. However, the structures of the core 11, the first cladding 12, the second cladding 13, and the support layer 14 are not particularly limited to the above structures. When the first cladding 12 has a lower refractive index than the core 11; and the second cladding 13 has a lower refractive index than the first cladding 12, the optical fiber may have any other structure. The core 11, the first cladding 12, the second cladding 13, and the support layer 14 may be doped with other dopants as needed.

INDUSTRIAL APPLICABILITY

As described above, the present invention is useful for, e.g., optical fibers brought into buildings in an FTTH system because the optical fiber of the present invention can maintain connectivity with a general single-mode fiber and reduce the bending loss.

The invention claimed is:

1. An optical fiber comprising:
    a core having an outer diameter of greater than or equal to 8.2 μm and less than or equal to 10 μm;
    a first cladding surrounding the core, having a lower refractive index than the core, and having an outer diameter of greater than or equal to 30 μm and less than or equal to 40 μm;
    a second cladding surrounding the first cladding, having a lower refractive index than the first cladding, and having a thickness of greater than or equal to 7.4 μm and equal to or less than 22.5 μm; and
    a support layer surrounding the second cladding,
    wherein a relative refractive index difference which is a ratio of a difference between a refractive index of the support layer and a refractive index of the second cladding to the refractive index of the support layer is greater than or equal to 0.5% and equal to or less than 1.65%, and
    the first cladding is doped with light attenuating dopant so that a concentration of the light attenuating dopant in the first cladding increases from an inner surface of the first cladding to an outer surface of the first cladding.

2. The optical fiber of claim 1, wherein a ratio of the outer diameter of the first cladding to the outer diameter of the core is 2.9-5.5.

3. The optical fiber of claim 1, wherein the light attenuating dopant is OH.

4. A method for fabricating the optical fiber of claim 1 by drawing a preform including a core forming portion, a first cladding forming portion surrounding the core forming portion, and a second cladding forming portion surrounding the first cladding forming portion, the method comprising:

forming the first cladding forming portion, and then introducing light attenuating dopant from an outer surface of the first cladding forming portion into the first cladding forming portion.

\* \* \* \* \*